United States Patent
Rivard

(10) Patent No.: US 10,179,659 B2
(45) Date of Patent: Jan. 15, 2019

(54) TOWING SYSTEM FOR A TRAVELLING MACHINE, IN PARTICULAR FOR A HELICOPTER

(71) Applicant: ORTEC EXPANSION, Aix-en-Provence (FR)

(72) Inventor: Daniel Rivard, Paris (FR)

(73) Assignee: ORTEC EXPANSION, Aix-en-Provence (FR)

( * ) Notice: Subject to any disclaimer, the term of this patent is extended or adjusted under 35 U.S.C. 154(b) by 0 days.

(21) Appl. No.: 15/450,481

(22) Filed: Mar. 6, 2017

(65) Prior Publication Data

US 2017/0320594 A1   Nov. 9, 2017

(30) Foreign Application Priority Data

Mar. 10, 2016 (FR) .................................. 16 52030

(51) Int. Cl.
*B60D 1/14* (2006.01)
*B64F 1/22* (2006.01)
*B60D 1/167* (2006.01)
*B64C 25/32* (2006.01)
*B64D 3/00* (2006.01)

(52) U.S. Cl.
CPC .............. *B64F 1/224* (2013.01); *B60D 1/143* (2013.01); *B60D 1/167* (2013.01); *B64C 2025/325* (2013.01); *B64D 3/00* (2013.01)

(58) Field of Classification Search
CPC ......... B64F 1/224; B60D 1/143; B60D 1/167; B64C 2025/325; B64D 3/00
See application file for complete search history.

(56) References Cited

U.S. PATENT DOCUMENTS

| | | | | |
|---|---|---|---|---|
| 2,391,608 A | * | 12/1945 | Wood ...................... | B64F 1/224 280/503 |
| 2,773,703 A | * | 12/1956 | Ferguson ................ | B64F 1/224 180/14.1 |
| 2,877,911 A | * | 3/1959 | Arnot ....................... | B64F 1/22 180/14.1 |

(Continued)

FOREIGN PATENT DOCUMENTS

FR    2675919 A1    10/1992

OTHER PUBLICATIONS

French Patent Office Search report dated Nov. 10, 2016 re French Application No. FR 1652030 of Ortec Expansion.

*Primary Examiner* — Joseph M Rocca
*Assistant Examiner* — Michael R Stabley
(74) *Attorney, Agent, or Firm* — Patrick J. Daugherty; Daugherty & Del Zoppo Co., LPA

(57) ABSTRACT

A towing system comprises a bar, a first attachment device arranged at a first end of the bar, the first attachment device being able to attach the towing system to a towing vehicle, a second attachment device arranged at a second end of the bar, the second attachment device being able to attach the towing system to a travelling machine to be towed, the second attachment device comprising a fork able to hold at least one wheel of the travelling machine, the fork having two longitudinal members between which at least one wheel of the travelling machine is able to be received, a separation device able to modify the spacing between the two longitudinal members and a holding device able to hold the wheel between the two longitudinal members.

9 Claims, 2 Drawing Sheets

(56) References Cited

U.S. PATENT DOCUMENTS

| | | | | |
|---|---|---|---|---|
| 3,004,773 | A * | 10/1961 | Ankeney | B64F 1/22 |
| | | | | 280/446.1 |
| 3,132,886 | A * | 5/1964 | Meeks | B64F 1/224 |
| | | | | 280/503 |
| 3,598,259 | A * | 8/1971 | Wright | B62D 53/068 |
| | | | | 414/428 |
| 3,895,828 | A * | 7/1975 | Bitantis | B64F 1/224 |
| | | | | 280/460.1 |
| 3,995,878 | A | 12/1976 | Geraci et al. | |
| 4,113,041 | A * | 9/1978 | Birkeholm | B60K 31/00 |
| | | | | 180/14.1 |
| 4,269,429 | A | 5/1981 | Eichstadt | |
| 4,470,564 | A * | 9/1984 | Johnson | B64F 1/22 |
| | | | | 180/904 |
| 4,883,280 | A * | 11/1989 | Christian | B64F 1/22 |
| | | | | 180/904 |
| 5,494,310 | A * | 2/1996 | Soles | B60D 1/155 |
| | | | | 280/450 |
| 6,450,756 | B1 * | 9/2002 | Stahancyk | B64F 1/224 |
| | | | | 180/904 |
| 6,543,790 | B2 * | 4/2003 | Johnson | B60D 1/145 |
| | | | | 180/904 |
| 8,562,014 | B2 * | 10/2013 | Seidman | B60D 1/145 |
| | | | | 280/495 |
| 9,108,463 | B2 * | 8/2015 | Winters | B60B 30/02 |
| 9,259,983 | B2 * | 2/2016 | Hohlrieder | B60D 1/155 |
| 2002/0098069 | A1 | 7/2002 | Stahancyk et al. | |
| 2012/0248738 | A1 | 10/2012 | Seidman et al. | |

\* cited by examiner

TOWING SYSTEM FOR A TRAVELLING MACHINE, IN PARTICULAR FOR A HELICOPTER

TECHNICAL FIELD

The present invention relates to a system for towing a travelling machine, and in particular an aircraft.

PRIOR ART

When an aircraft, in particular a helicopter, is towed on the ground, it is necessary for the towing system used for this purpose to be capable of holding at least one front wheel of the aircraft. Depending on the type of aircraft, the size and/or configuration of the wheel or wheels may be different.

The towing system may be more or less suitable depending on the type of aircraft that it must tow. However, it may be useful for a towing system to be able to be intended for towing several types of aircraft.

DISCLOSURE OF THE INVENTION

The object of the present invention is to overcome this drawback, by proposing a towing system that is easily adaptable to any type of travelling machine, and more particularly to an aircraft such as a helicopter in particular.

To this end, the invention relates to a towing system comprising:
  a bar having a longitudinal axis,
  a first attachment device arranged at a first end of the bar, the first attachment device being able to attach the towing system to a towing vehicle,
  a second attachment device arranged at a second end of the bar, the second attachment device being able to attach the towing system to a travelling machine to be towed.

According to the invention, the second attachment device comprises a fork able to hold at least one wheel of the travelling machine.

In addition, according to the invention, the fork has:
  two longitudinal members between which at least one wheel of the travelling machine is able to be received, each longitudinal member having a longitudinal axis substantially parallel to the longitudinal axis of the bar,
  a separation device able to modify the spacing between the two longitudinal members,
  a holding device able to hold the wheel between the two longitudinal members.

Thus, by virtue in particular of said fork and said separation device, the towing system can be adapted to a given spacing for holding the wheel or wheels, in particular the front wheels of a helicopter. The towing system is thus easily adaptable to any type of travelling machine, and in particular an aircraft, to be towed.

According to one defining feature, the separation device comprises:
  two sliding arms, each sliding arm having:
    a longitudinal axis forming an angle with the longitudinal axis of the bar,
    a first part, one end of which is fixed to one end of one longitudinal member, and
    a second part, one end of which is fixed to the second end of the bar, the second part being able to slide in the first part along the longitudinal axis of the sliding arm,
  an actuation device configured so as to cause the simultaneous sliding of the sliding arms.

Preferably, the actuation device comprises:
  four rods hinged in pairs in order to form a deformable parallelogram lying in a plane substantially parallel to the longitudinal axes of the longitudinal members, the four rods being hinged at a first pair of opposite corners of the parallelogram on a first hinge and a second hinge and at a second pair of opposite corners on a third hinge and a fourth hinge, the first hinge being rotatably connected to the first part of a sliding arm on an axis perpendicular to the plane of the parallelogram, the second hinge being rotatably connected to the first part of the other sliding arm on an axis perpendicular to the plane of the parallelogram,
  a threaded rod able to be screwed into a nut secured to the third hinge, the threaded rod having a first end able to turn in a housing secured to the fourth hinge, the threaded rod being configured so that screwing or unscrewing in the nut is able to cause the first hinge and the second hinge to move closer together or further away from each other, respectively, said moving closer together or said moving further apart being able to cause a sliding of the second part of each arm in the first part, said sliding being able to cause the reduction or increase in the spacing between the longitudinal members.

In addition, the threaded rod comprises a second end provided with a device for controlling the screwing and unscrewing of the threaded rod in the nut.

Furthermore, the holding device comprises, for each longitudinal member:
  at least one first roller fixed to the free end of the longitudinal member,
  at least one second roller connected to the longitudinal member so as to translate along the longitudinal axis of the longitudinal member by means of a guide element,
  a resilient device able to exert a first force on the second roller along the longitudinal axis of the longitudinal member, the first force being able to cause the second roller to move closer to the first roller so that the second roller is able to force the wheel of the travelling machine to bear against the first roller,
  a control device, the actuation of which makes it possible to exert a second force opposing the first force, the second force being able to cause the second roller to move away from the first roller so as to release the wheel of the travelling machine.

Moreover, the control device comprises at least one winch and two cables, each cable having a first end fixed to the winch and a second end fixed to the second roller, the actuation of the winch being able to pull each of said cables, which are able to exert the second force on the second roller.

Advantageously, the guide element comprises:
  a support for the second roller, to which the second roller is fixed, and
  a rod fixed to the longitudinal member in parallel with the longitudinal axis of the longitudinal member, the rod being able to guide the support for the second roller in translation.

According to a variant, the resilient device comprises a draw spring able to exert the first force on the support for the second roller.

In addition, the towing system comprises orientable wheels fixed along the bar and fork so that the towing system is movable.

Preferably, the system comprises a force sensor which is fixed to the bar and is able to detect the traction and torsion exerted on the bar.

BRIEF DESCRIPTION OF THE FIGURES

The invention, together with its features and advantages, will become clearer upon reading the description given with reference to the accompanying drawings, in which.

DETAILED DESCRIPTION

Figure 1:
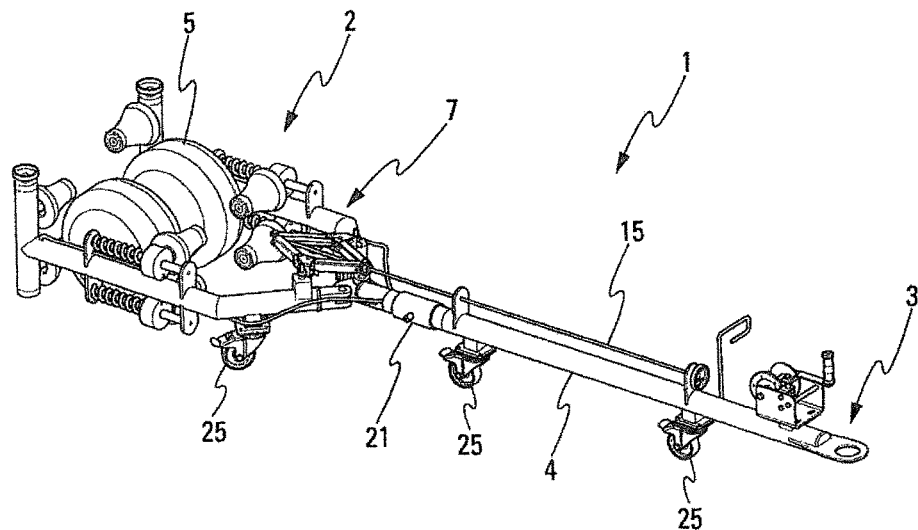
FIG. 1 is a perspective view of a towing system according to one embodiment.
Figure 2:
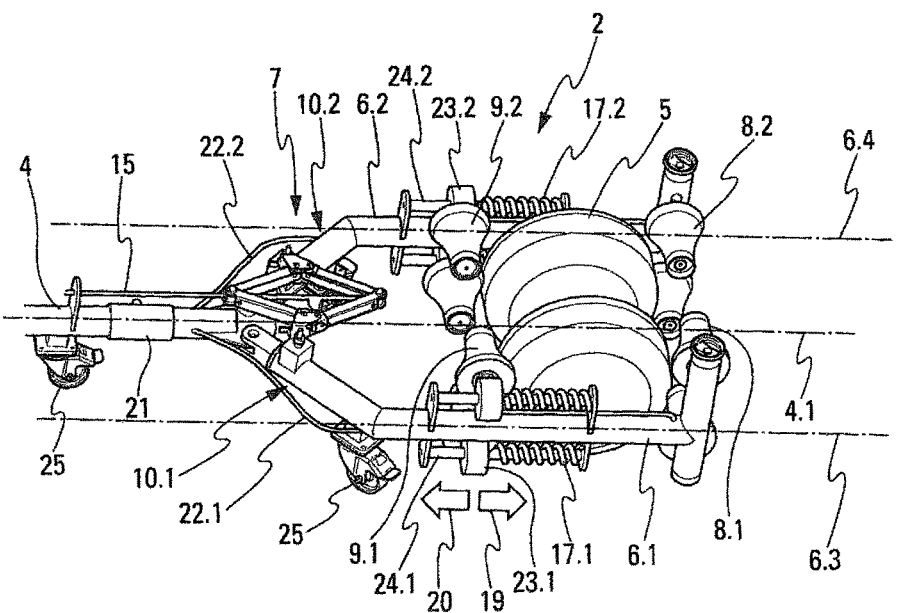
FIG. 2 is a perspective view of the second attachment device of the towing system.
Figure 3:
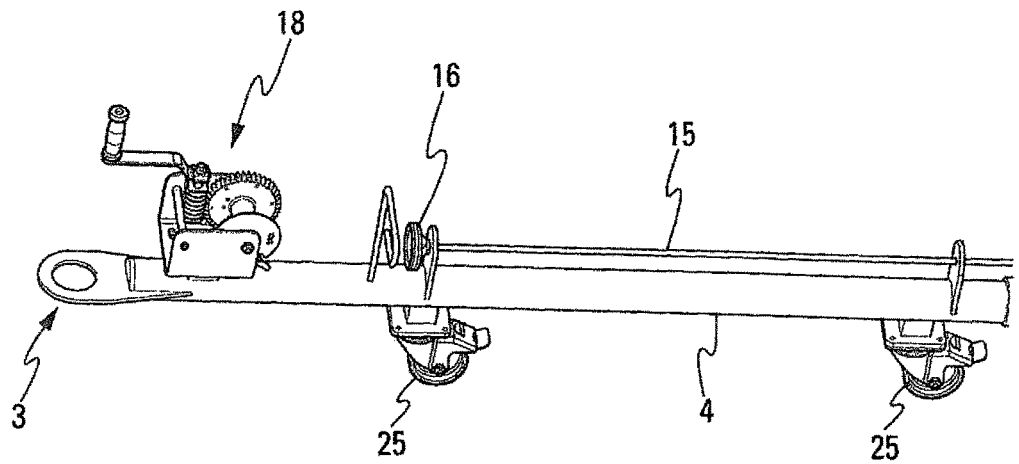
FIG. 3 is a perspective view of the first attachment device of the attachment system.

The remainder of the description will refer to the above-mentioned figures.

The invention relates to a towing system 1 comprising a bar 4 provided with a longitudinal axis 4.1.

The towing system 1 further comprises a first attachment device 3 arranged at a first end of the bar 4. The first attachment device 3 makes it possible to attach the towing system to a common towing vehicle. By way of example, the towing vehicle is a tractor.

The towing system also comprises a second attachment device 2 arranged at a second end of the bar 4. The second attachment device 2 makes it possible to attach the towing system 1 to a travelling machine to be towed. By way of example, the travelling machine is an aeroplane or a helicopter, provided with wheels and able to taxi on the ground.

The second attachment device 2 comprises a fork able to hold at least one wheel 5 of the travelling machine. The fork has two longitudinal members 6.1 and 6.2 between which at least one wheel 5 of the travelling machine can be received. Each longitudinal member 6.1 and 6.2 has a longitudinal axis 6.3 and 6.4 substantially parallel to the longitudinal axis 4.1 of the bar 4.

By way of example, the wheel or wheels 5 form part of a landing gear of an aircraft, preferably the front landing gear of a helicopter.

In the example described below, it is considered that the travelling machine comprises two wheels 5 forming part of the same running gear or assembly (not shown).

The fork also comprises a separation device 7 and a holding device 9.1, 9.2, 8.1, 8.2. The separation device 7 makes it possible to modify the spacing between the two longitudinal members 6.1 and 6.2. The holding device 9.1, 9.2, 8.1, 8.2 makes it possible to hold the wheels 5 between the two longitudinal members 6.1, 6.2.

The spacing corresponds to the interaxial spacing between the two longitudinal members 6.1 and 6.2.

According to a preferred embodiment, the separation device 7 comprises two sliding arms 10.1, 10.2 and an actuation device.

Figure 4:
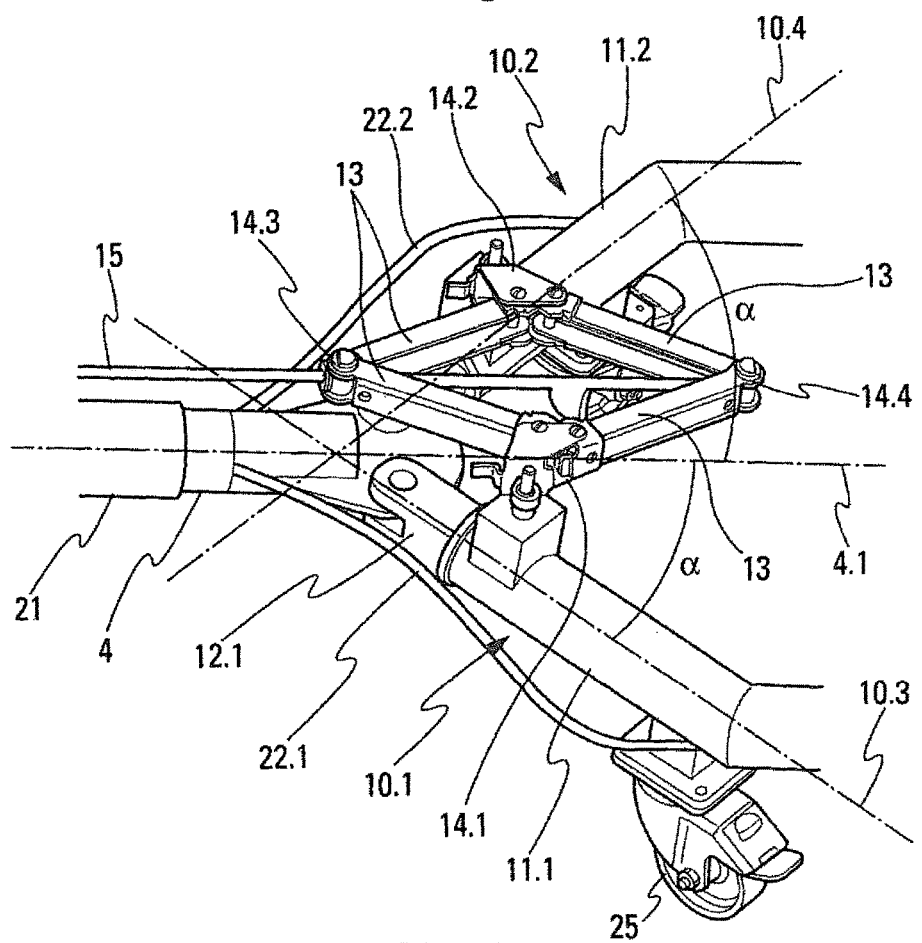
FIG. 4 is a perspective view of the separation device.

Each sliding arm 10.1, 10.2 has a longitudinal axis 10.3, 10.4 forming an angle α with the longitudinal axis 4.1 of the bar 4 (FIG. 4). Each sliding arm further comprises a first part 11.1, 11.2, one end of which is fixed to one end of one longitudinal member 6.1, 6.2, and a second part 12.1, 12.2, one end of which is fixed to the second end of the bar 4. The second part 12.1, 12.2 can slide in the first part 11.1, 11.2 along the longitudinal axis 10.3, 10.4 of the sliding arm 10.1, 10.2.

The actuation device is configured so as to cause the simultaneous sliding of the sliding arms 10.1, 10.2.

According to one configuration, the actuation device comprises four rods 13 hinged in pairs in order to form a deformable parallelogram lying in a plane substantially parallel to the longitudinal axes 6.3, 6.4 of the longitudinal members 6.1, 6.2. The four rods 13 are hinged at a first pair of opposite corners of the parallelogram on a first hinge 14.1 and a second hinge 14.2 and at a second pair of opposite corners on a third hinge 14.3 and a fourth hinge 14.4. The first hinge 14.1 is rotatably connected to the first part 11.1 of a sliding arm 10.1 on an axis perpendicular to the plane of the parallelogram. The second hinge 14.2 is rotatably connected to the first part 11.2 of the other sliding arm 10.2 on an axis perpendicular to the plane of the parallelogram.

The actuation device further comprises a threaded rod 15 able to be screwed into a nut secured to the third hinge 14.3. The threaded rod 15 has a first end able to turn in a housing secured to the fourth hinge 14.4. The threaded rod 15 is configured so that screwing or unscrewing in the nut is able to cause the first hinge 14.1 and the second hinge 14.2 to move closer together or further apart from each other, respectively. Said moving closer together or said moving further apart is able to cause a sliding of the second part 12.1, 12.2 of each arm 10.1, 10.2 in the first part 11.1, 11.2. Said sliding is able to cause a reduction or increase in the spacing between the longitudinal members 6.1, 6.2. Thus, when the third hinge 14.3 moves away from the fourth hinge 14.4, the spacing between the longitudinal members 6.1, 6.2 decreases. When the third hinge 14.3 moves closer to the fourth hinge 14.4, the spacing between the longitudinal members 6.1, 6.2 increases. The threaded rod 15 may comprise a second end provided with a device 16 for controlling the screwing and unscrewing of the threaded rod 15 in the nut.

According to one embodiment, the holding device 9.1, 9.2, 8.1, 8.2 comprises, for each longitudinal member 6.1, 6.2, at least one first roller 8.1, 8.2 fixed to the free end of the longitudinal member 6.1, 6.2. Preferably, the holding device comprises, for each longitudinal member 6.1, 6.2, two first rollers 8.1, 8.2 arranged in parallel.

The holding device also comprises at least one second roller 9.1, 9.2 connected to the longitudinal member 6.1, 6.2 so as to move in translation along the longitudinal axis 6.3, 6.4 of the longitudinal member 6.1, 6.2 by means of a guide element that guides a movement of the second roller 9.1, 9.2 in parallel with the longitudinal axis 6.3, 6.4 of the longitudinal member 6.1, 6.2. Preferably, the holding device comprises, for each longitudinal member 6.1, 6.2, two second rollers 9.1, 9.2 arranged in parallel.

The holding device also comprises a resilient device 17.1, 17.2 able to exert a first force 19 on the second roller 9.1, 9.2 along the longitudinal axis 6.3, 6.4 of the longitudinal member 6.1, 6.2. The first force 19 causes the second roller 9.1, 9.2 to move closer to the first roller 8.1, 8.2 so that the second roller 9.1, 9.2 is able to force the wheel 5 of the travelling machine to bear against the first roller 8.1, 8.2.

The resilient device 17.1, 17.2 may comprise a draw spring able to exert the first force 19 on the support 23.1, 23.2 for the second roller 9.1, 9.2.

In addition, the holding device comprises a control device 18, 22.1, 22.2, the actuation of which makes it possible to exert a second force 20 opposing the first force 19. The second force 20 causes the second roller 9.1, 9.2 to move away from the first roller 8.1, 8.2 so as to release the wheel 5 of the travelling machine.

According to one configuration, the control device 18, 22.1, 22.2 comprises at least one winch 18 and two cables 22.1, 22.2. Each cable 22.1, 22.2 has a first end fixed to the winch 18 and a second end fixed to the second roller 9.1, 9.2. Actuation of the winch 18 makes it possible to pull each of said cables 22.1, 22.2, which are able to exert the second force 20 on the second roller 9.1, 9.2.

According to one configuration, the guide element comprises a support 23.1, 23.2 for the second roller 9.1, 9.2, to which the second roller 9.1, 9.2 is fixed, and a rod 24.1, 24.2 fixed to the longitudinal member 6.1, 6.2 in parallel with the longitudinal axis 6.3, 6.4 of the longitudinal member 6.1, 6.2. The rod 24.1, 24.2 makes it possible to guide the support 23.1, 23.2 for the second roller 9.1, 9.2 in translation.

The towing system 1 can be provided with orientable wheels 25 fixed along the bar 4 and fork so that the towing system 1 is movable.

The towing system 1 may also comprise a force sensor 21 fixed to the bar. This sensor 21 makes it possible to detect the traction and/or torsion exerted on the bar 4.

The present description details various embodiments and configurations or variants with reference to figures and/or technical features. A person skilled in the art will understand that the various technical features of the various embodiments or configurations may be combined together in order to obtain other embodiments and configurations, provided that the converse is not explicitly mentioned or that these technical features are not incompatible. Likewise, a technical feature of one embodiment or configuration may be isolated from the other technical features of this embodiment provided that the converse is not mentioned. In the present description, numerous specific details are provided by way of illustration and in no way limitatively, so as to detail the invention precisely. A person skilled in the art will however understand that the invention can be implemented in the absence of one or more of these specific details or with variants. On other occasions, some aspects are not described so as to avoid obscuring and overcomplicating the present description and a person skilled in the art will understand that diverse and varied means can be used and that the invention is not limited solely to the examples described.

It must be obvious to a person skilled in the art that the present invention allows embodiments in numerous other specific forms without departing from the field of application of the invention as claimed. Consequently, the present embodiments must be considered by way of illustration, but may be modified in the field defined by the scope of the accompanying claims, and the invention must not be limited to the details given above.

The invention claimed is:

1. Towing system, comprising:
   a bar having a longitudinal axis;
   a first attachment device arranged at a first end of the bar, the first attachment device configured to attach a towing system to a towing vehicle;
   a second attachment device arranged at a second end of the bar, the second attachment device configured to attach the towing system to a travelling machine to be towed;
   wherein the second attachment device comprises a fork configured to hold at least one wheel of the travelling machine;
   the fork having two longitudinal members arranged to receive therebetween at least one wheel of the travelling machine, each longitudinal member having a longitudinal axis substantially parallel to a longitudinal axis of the bar;
   a separation device configured to modify an interaxial spacing between the two longitudinal members; and
   a holding device configured to hold the wheel between the two longitudinal members; and
   wherein the separation device comprises:
   two sliding arms, each sliding arm having:
   a longitudinal axis forming an angle ($\alpha$) with the longitudinal axis of the bar;
   a first part comprising an end that is fixed to one end of one longitudinal member; and
   a second part comprising an end that is fixed to a second end of the bar, the second part configured to slide in the first part along the longitudinal axis of the sliding arm; and
   an actuation device configured so as to cause a simultaneous sliding of the sliding arms.

2. System according to claim 1, wherein the actuation device comprises:
   four rods hinged in pairs in order to form a deformable parallelogram lying in a plane substantially parallel to the longitudinal axes of the longitudinal members, the four rods being hinged at a first pair of opposite corners of the parallelogram on a first hinge and a second hinge and at a second pair of opposite corners on a third hinge and a fourth hinge, the first hinge being rotatably connected to the first part of one of the sliding arms on an axis perpendicular to the plane of the parallelogram, the second hinge being rotatably connected to the first part of another of the sliding arms on an axis perpendicular to the plane of the parallelogram;
   a threaded rod configured to screw into a nut secured to the third hinge, the threaded rod having a first end configured to turn in a housing secured to the fourth hinge, the threaded rod being configured so that screwing or unscrewing in the nut causes the first hinge and the second hinge to move closer together or further apart from each other, respectively, said moving closer together or said moving further apart configured to cause a sliding of the second part of each arm in the first part, said sliding of the second part of each arm in the first part configured to cause a reduction or increase in the spacing between the longitudinal members.

3. System according to claim 2, wherein the threaded rod comprises a second end provided with a device for controlling screwing and unscrewing of the threaded rod in the nut.

4. System according to claim 1, wherein the holding device comprises, for each of the longitudinal members:
   at least one first roller fixed to a free end of the longitudinal member;
   at least one second roller connected to the longitudinal member so as to translate along the longitudinal axis of the longitudinal member by means of a guide element;
   a resilient device configured to exert a first force on the second roller along the longitudinal axis of the longitudinal member, the first force configured to cause the second roller to move closer to the first roller so that the second roller is able to force the wheel of the travelling machine to bear against the first roller; and
   a control device, the actuation of which makes it possible to exert a second force opposing the first force, the second force being able to cause the second roller to move away from the first roller so as to release the wheel of the travelling machine.

5. System according to claim 4, wherein the control device comprises at least one winch and two cables, each cable having a first end fixed to the winch and a second end fixed to the second roller, wherein actuation of the winch pulls each of said cables to thereby exert the second force on the second roller.

6. System according to claim 4, wherein the guide element comprises:
   a support for the second roller, to which the second roller is fixed; and
   a rod fixed to the longitudinal member in parallel with the longitudinal axis of the longitudinal member, the rod configured to guide the support for the second roller in translation.

7. System according to claim 4, wherein the resilient device comprises a draw spring configured to exert the first force on the support for the second roller.

8. System according to claim 1, wherein the towing system comprises orientable wheels fixed along the bar and fork so that the towing system is movable.

9. System according to claim 1, wherein the system comprises a force sensor fixed to the bar and configured to detect traction and torsion exerted on the bar.

* * * * *